United States Patent
Smith et al.

(10) Patent No.: US 6,980,354 B1
(45) Date of Patent: Dec. 27, 2005

(54) SELF-SEEDING RING OPTICAL PARAMETRIC OSCILLATOR

(75) Inventors: Arlee V. Smith, Albuquerque, NM (US); Darrell J. Armstrong, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 214 days.

(21) Appl. No.: 10/441,597

(22) Filed: May 19, 2003

(51) Int. Cl.[7] ................................................. G02F 1/39
(52) U.S. Cl. ...................................................... 359/330
(58) Field of Search ............. 359/326–332; 372/21–22

(56) References Cited

U.S. PATENT DOCUMENTS

| | | | | |
|---|---|---|---|---|
| 5,079,445 A | * | 1/1992 | Guyer | 359/330 |
| 5,276,548 A | * | 1/1994 | Margalith | 359/330 |
| 5,530,582 A | | 6/1996 | Clark | 359/333 |
| 5,577,058 A | | 11/1996 | Kafka et al. | 372/20 |
| 5,619,517 A | | 4/1997 | Dixon | 372/21 |
| 5,841,570 A | | 11/1998 | Velsko | 359/330 |
| 6,295,160 B1 | * | 9/2001 | Zhang et al. | 359/330 |
| 6,775,054 B1 | * | 8/2004 | Smith et al. | 359/330 |

OTHER PUBLICATIONS

Cleo, "Narrowband tuning of a pulsed optical parametric oscillator by wavelength-selective feedback," Applied Nonlinear Optics, Jun. 1-5, 2003, 2234.

* cited by examiner

*Primary Examiner*—John D. Lee
(74) *Attorney, Agent, or Firm*—Elmer A. Klavetter

(57) ABSTRACT

An optical parametric oscillator apparatus utilizing self-seeding with an external nanosecond-duration pump source to generate a seed pulse resulting in increased conversion efficiency. An optical parametric oscillator with a ring configuration are combined with a pump that injection seeds the optical parametric oscillator with a nanosecond duration, mJ pulse in the reverse direction as the main pulse. A retroreflecting means outside the cavity injects the seed pulse back into the cavity in the direction of the main pulse to seed the main pulse, resulting in higher conversion efficiency.

16 Claims, 5 Drawing Sheets

SELF-SEEDING RING OPTICAL PARAMETRIC OSCILLATOR

This invention was made with Government support under Contract No. DE-AC04-94AL85000 awarded by the Department of Energy. The Government has certain rights in the invention.

RELATED APPLICATIONS

This application is related to U.S. Pat. No. 6,775,054 entitled "IMAGE-ROTATING, 4-MIRROR, RING OPTICAL PARAMETRIC OSCILLATOR," issued on Aug. 10, 2004, assigned to the same assignee as that of the present invention and fully incorporated herein by reference.

BACKGROUND OF THE INVENTION

The invention relates to an optical parametric oscillator (OPO) system with improved conversion efficiency and, more particularly, to an OPO system using self-seeding to improve conversion efficiency.

Optical parametric amplification (OPA) is a nonlinear optical process whereby light at one wavelength, the pump wavelength, is used to generate light at two other (longer) wavelengths in a nonlinear optical material with a nonvanishing second order nonlinear susceptibility. Optical gain is established at two wavelengths, conventionally referred to as the signal and idler wavelengths. The sum of the energies of a signal photon and an idler photon are equal to the energy of a pump photon. There is no fundamental physical distinction between the idler wave and the signal wave. An optical parametric oscillator (OPO) is a resonant optical cavity containing a nonlinear material which provides OPA when pumped by a beam of laser radiation at a pump frequency from a pump source.

The content and orientation of the crystal and the design of the resonant cavity determines the signal and idler frequencies. The gain within the nonlinear medium combined with feedback within the resonant cavity permits oscillation, a process similar to build-up in a laser cavity. The cavity can either be singly resonant in which end mirrors reflect only the signal frequency or doubly resonant in which end mirrors reflect both signal and idler frequencies. End mirrors of the OPO are often transparent to the pump frequency, although they reflect the pump in some designs. OPOs with singly resonant cavities are typically more stable in their output than OPOs with doubly resonant cavities.

A schematic diagram of a prior art 4-mirror, ring OPO appears in FIG. 1 (U.S. patent application Ser. No. 10/217,853 filed Aug. 12, 2002). FIG. 1 illustrates one embodiment of the 4-mirror, nonplanar ring system of the present invention. The system has 4 mirrors, designated as M1, M2, M3 and M4. In general, the pump laser beam enters through a partially transmissive mirror (for example, M1) and exits through another partially transmissive mirror (for example, M2) although the other mirrors could also be used to admit and emit the pump light. Mirrors M3 and M4 are identical in order to maintain polarization with only one wave plate (WP1), a half-wave plate, situated between mirrors M2 and M3, although the wave plate could also be situated between mirrors M1 and M4. This half-wave plate is included to maintain linear polarization at the crystal. These mirrors reflect the signal wave and could also reflect the idler and pump, although this is usually undesirable because it makes signal/idler wavelength selection difficult. Situated between mirrors M1 and M2 is at least one nonlinear optical medium C1 (generally a crystal).

To obtain a useful device, it is necessary to be able to choose a specific signal wavelength. This is made possible within the nonlinear material itself, as useful gain appears only when the pump wave, the signal wave, and the idler wave can propagate and stay in phase with each other. This phase matching condition is difficult to establish. Optical materials generally exhibit a property called dispersion, in which the refractive index varies with wavelength. Normally, shorter wavelength light propagates more slowly than do longer wavelengths. Consequently, as waves with different frequencies propagate they rapidly move in and out of phase with each other. The resulting interference prevents the signal wave from experiencing significant optical gain. The most common ways of phase matching are to take advantage of birefrigence often present in nonlinear crystals or to quasi-phase match by periodically changing the orientation of the nonlinear crystal to periodically rephase the pump, signal, and idler waves.

An optical parametric oscillator system that provides an improved beam is described by Nabors et al. (U.S. Pat. No. 5,781,571, issued on Jul. 14, 1998), utilizing an elongated resonant cavity with an output coupling device at one end and a Porro prism at the opposite end. Ansteft et al. (G. Ansteft, G. Goritz, D. Kabs, R. Urschel, R. Wallenstein, and A. Borsutzky, 2001, Appl. Phys. B., DOI 10.1007) describe a method for reducing beam divergence using collinear type-II phase matching and back reflection of the pump beam. Alford et al. (U.S. Pat. No. 6,147,793, issued on Nov. 14, 2000) also describe a class of optical parametric oscillators that introduce means for reducing signal losses due to backconversion of signal photons in the nonlinear optical medium. Elimination of backconversion results in improved beam quality compared with an OPO in which backconversion is present.

Another way to communicate phase across the beam is by spatial walk off between the signal and idler beams, combined with image rotations (Smith, A. and Bowers, M., presented at University of Kaiserslautern, Kaiserslautern, Germany, May 5, 2000; incorporated herein by reference). Walk off, which describes the angle difference p between the signal and idler Poynting vectors in the crystal (nonlinear medium), tends to smooth the phase of the signal beam over regions that interact with a particular portion of the idler beam. For a single pass through the crystal, this is a stripe of length equal to the walk off displacement within the crystal. Over successive passes of an OPO cavity, the stripe lengthens by this amount on each pass. This leads to a set of stripes of uniform phase oriented parallel to the walk off direction but with an independent phase for each stripe.

Nanosecond OPOs are typically pumped by laser pulses of 1–100 ns duration. OPOs driven by such nanosecond-duration pump pulses operate in a transient regime. In contrast with continuous-wave OPOs, these nanosecond OPOs never reach a steady state of oscillation. The build-up time is typically a significant fraction of the pump duration before the pump pulse is depleted, reducing conversion efficiency. This lag can be reduced by pumping the OPO with a more powerful pulse but this tends to increase the back conversion with a single pass of the OPO crystal. This back conversion converts the signal and idler energy back into pump energy, limiting the conversion efficiency. This effect is often manifested by a roll-over in the plot of signal output energy versus pump energy. Back conversion also tends to deplete the center of the signal and idler beams, reducing the quality of the beams, often quantified with $M^2$.

DETAILED DESCRIPTION OF THE INVENTION

An optical parametric oscillator (OPO) is an optical device pumped by a coherent light source, such as a laser, that generates waves (radiation) in a nonlinear medium within a resonant optical cavity. In the present invention, a nanosecond optical parametric oscillator system utilizes injection seeding with a sub-microsecond duration, mJ pulse that significantly improves OPO conversion efficiency and pulse shape over unseeded OPOs or OPOs seeded by continuous-wave light. The OPO can be seeded with a pulse of signal or idler light early in the pump pulse so that the OPO can reach threshold quickly. This permits high pump depletion at relatively low pump levels, which also reduces back conversion and beam distortion. If the seed light is of high beam quality, it can also help improve beam quality by seeding the desired transverse mode. The seed pulse, generally on the order of 1 mJ of seed light but ranging from approximately 1 $\mu$J to approximately 10 mJ, can be generated in various ways but the most convenient is self seeding in which the same OPO is used to generate a weak seed pulse and the stronger main pulse. Generating the seed pulse in the OPO by a weak pre-pump pulse is particularly useful because the seed light automatically is resonant with the cavity and because it minimizes the optical hardware required for seed generation.

Figure 1:
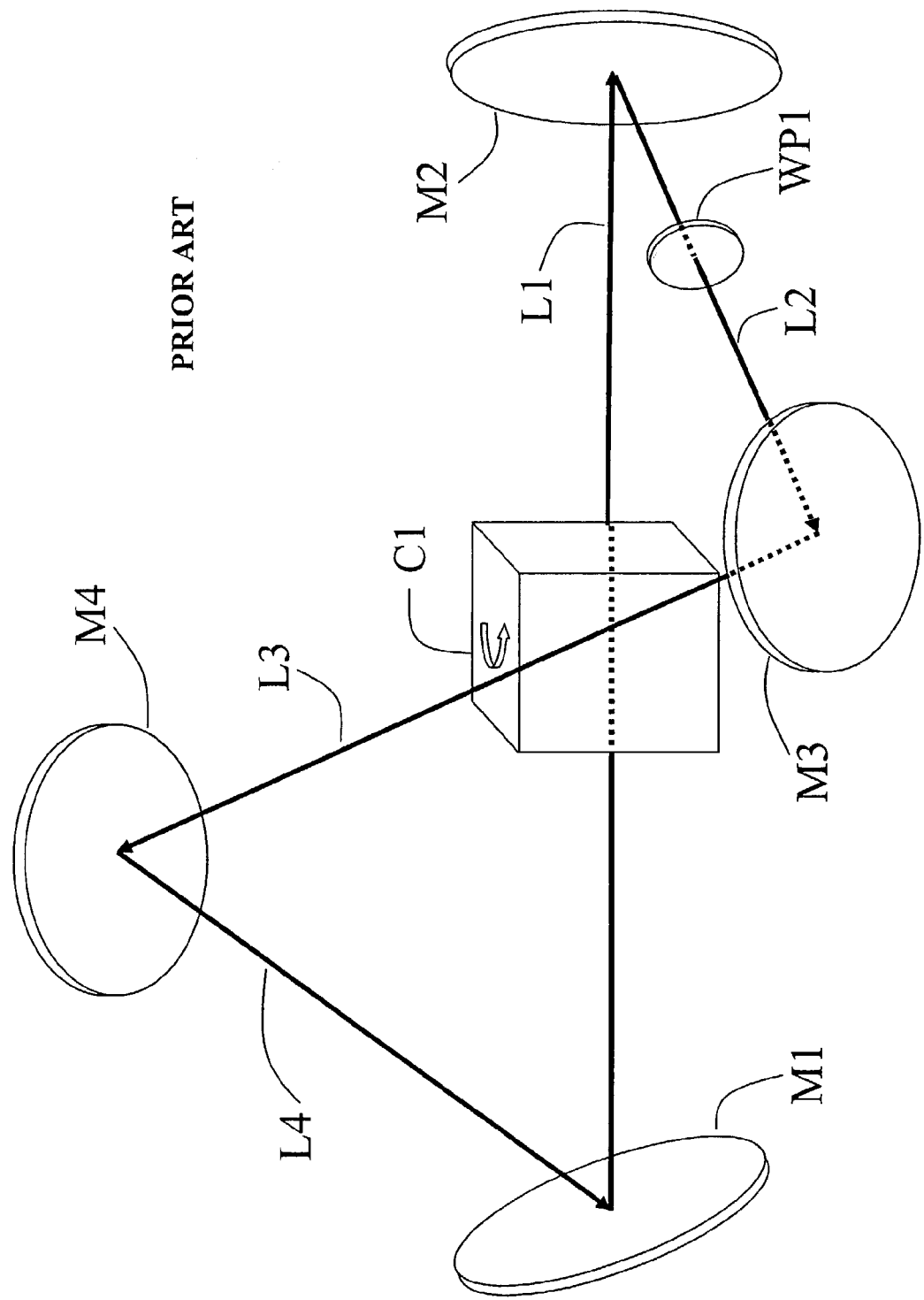
FIG. 1 illustrates a prior art ring optical parametric oscillator.
Figure 2:
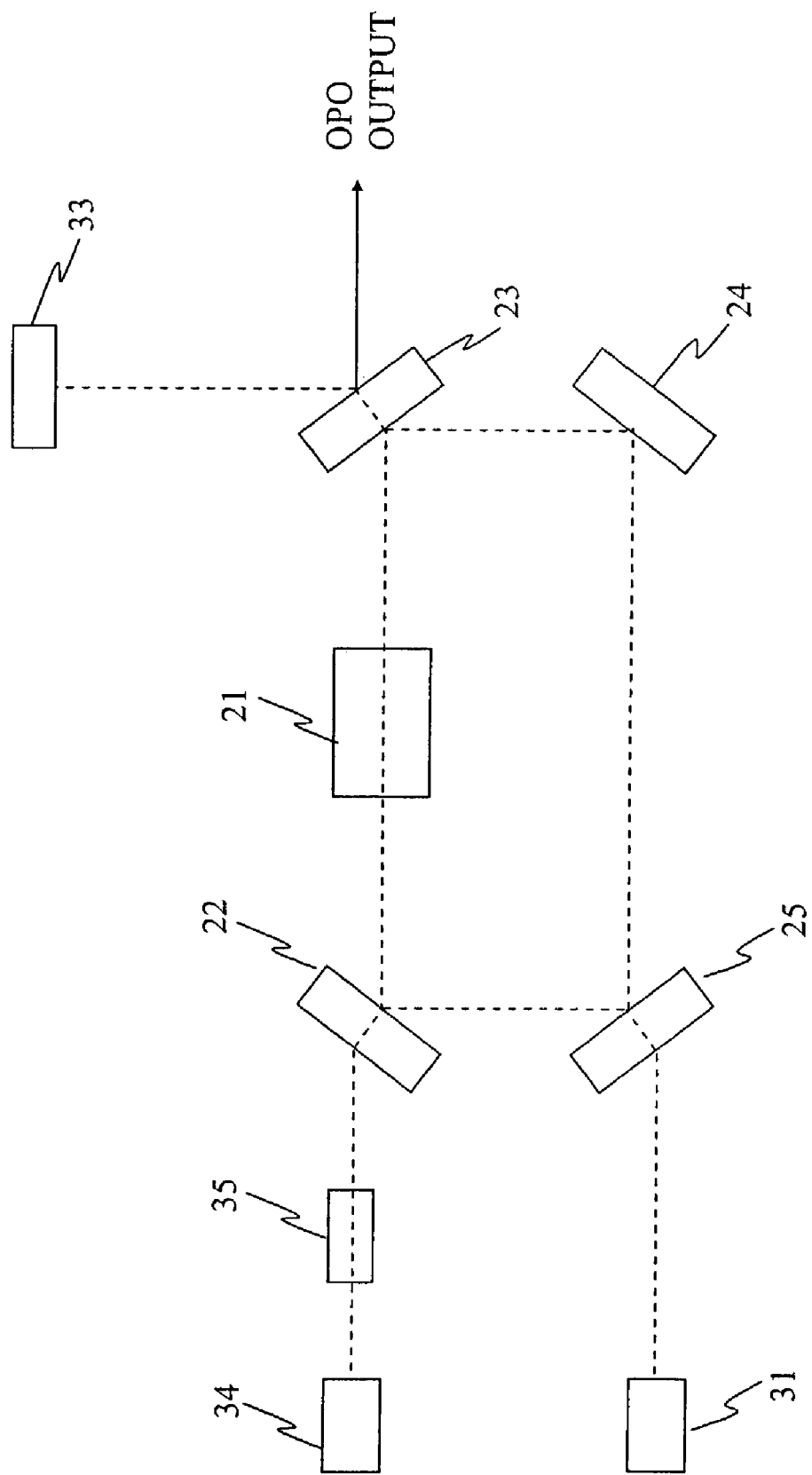
FIG. 2 illustrates an embodiment of the optical parametric oscillator of the present invention utilizing a ring configuration with self-seeding.

When the OPO is in a ring-cavity configuration, the seed can be generated in the cavity circulating in the reverse direction of the main pulse. A retroreflecting means, such a mirror or beam expander, outside the cavity then injects the seed light back into the cavity now going in the forward direction so that it can seed the main pulse. FIG. 2 illustrates a ring-cavity OPO with self-seeding capability (the dashed line represents the light beam). The ring cavity in FIG. 2 utilizes four mirrors; a ring cavity can be formed using standard techniques using three or more mirrors. In one embodiment, illustrated using four mirrors, the OPO is formed by the crystal 21 and the four mirrors 22, 23, 24, and 25, surrounding it. The crystal 21 can be situated between mirrors 22 and 23 in the path of the light beam or between mirrors 24 and 25, or both. Mirror 23 is at least partially transmissive and at least partially reflective to the signal beam to provide output coupling of the signal. A means for generating a seed pulse 31, referred to as the backward pump, (such as a pump laser, and more particularly, a nanosecond pulsed laser) causes the counter-clockwise signal wave to build up from quantum noise or from the optional continuous-wave seed light. The signal pulse is partially transmitted through the output coupler mirror 23 to a retroreflector means 33. (Equivalently, mirror 24 could be the output coupler mirror and the signal pulse would be partially transmitted through mirror 24 to the retroreflector means 33). The reflected signal pulse, acting as a delayed seed, arrives back at the output coupler 23 of the OPO just as the main pump pulse arrives from the forward pump 34 (such as a pump laser, a nanosecond pulsed laser, or a Q-switched solid state laser), which is the means for generating a pump beam into the cavity. The injected pulse is now going clockwise around the cavity and can be amplified by the main pump pulse. The presence of strong signal light in the cavity turns the OPO on early in the pump pulse, avoiding the usual time delay of nanosecond OPOs which limits conversion efficiency. The main signal pulse is transmitted through the output coupler in the direction labeled "OPO OUTPUT" in the figure and is unimpeded by the retroreflection means 33 optics. The time delay between the pump pulses and the spatial properties of the retroreflected beam can be adjusted by the time delay means 35 to optimize the OPO efficiency and beam quality. The frequency of the seed pulse automatically matches the resonant frequency of the OPO. The seed pulse can be spatially and spectrally filtered by inclusion of a spectral filter 37 situated (see FIG. 3) between mirror 23 and retroflector means 33 if needed before reinjecting into the OPO.

The backward pump pulse that generates the seed can have a much smaller energy than the main pulse if the diameter of the main pulse is large and that of the seed is small. This means that only a small fraction of the pump energy is needed for the seed, saving most for the main pulse. Thus the loss of energy to the seed can be more than recovered by the increased efficiency for the main pulse. If the reinjected seed pulse has good beam quality and is well-matched to the OPO cavity mode, the beam quality can also be improved. The system of the present invention not only preferentially seeds the lowest order mode but allows the use of a weaker pump beam so back conversion and the associated beam degradation is reduced.

Figure 3:
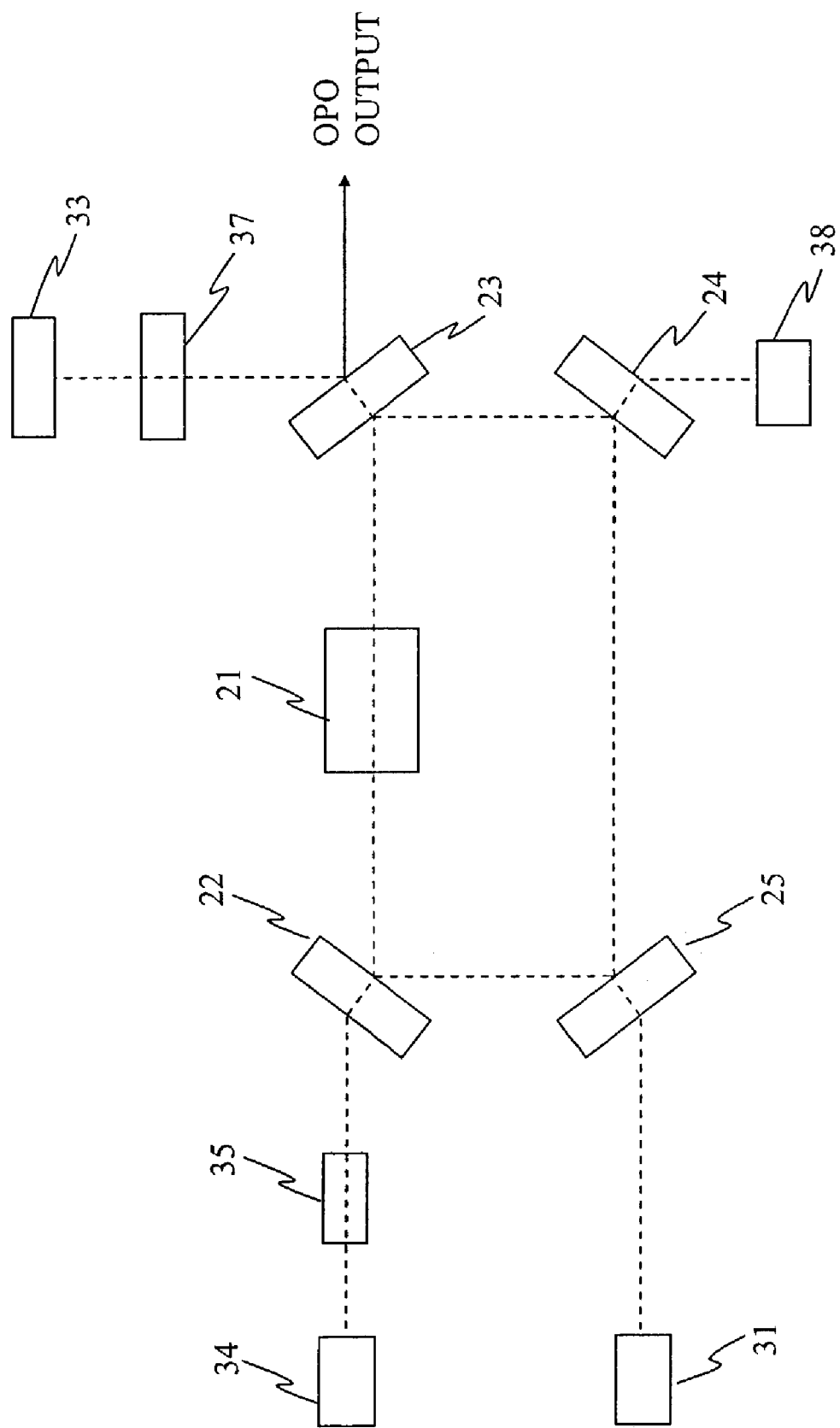
FIG. 3 illustrates an embodiment of the optical parametric oscillator of the present invention utilizing a ring configuration with self-seeding.

Optionally, in another embodiment, a backward-propagating single-frequency continuous wave (cw) seed beam can be injected into the OPO cavity, and the OPO cavity locked to the cw seed laser, or the cw seed laser locked to the OPO cavity, so that the self-seed pulse generated by the weak backward-propagating pump will itself be in resonance with a single longitudinal mode of the OPO. In this way all the same benefits obtained from self-seeding are retained with the additional feature that self-seeded oscillation will now occur on a single longitudinal mode of the OPO. Such narrow bandwidth self-seeding provides precise wavelength control for any application requiring frequency-stabilized oscillation. FIG. 3 illustrates a beam transmitted into the cavity through mirror 24 from pump 38 (such as a pump laser, a nanosecond pulsed laser, or a Q-switched solid state laser). It does not matter which cavity mirror is used to inject the backward propagating single-frequency cw seed beam, but for convenience it is usually not either of the mirrors used for pump beams.

Figure 4:
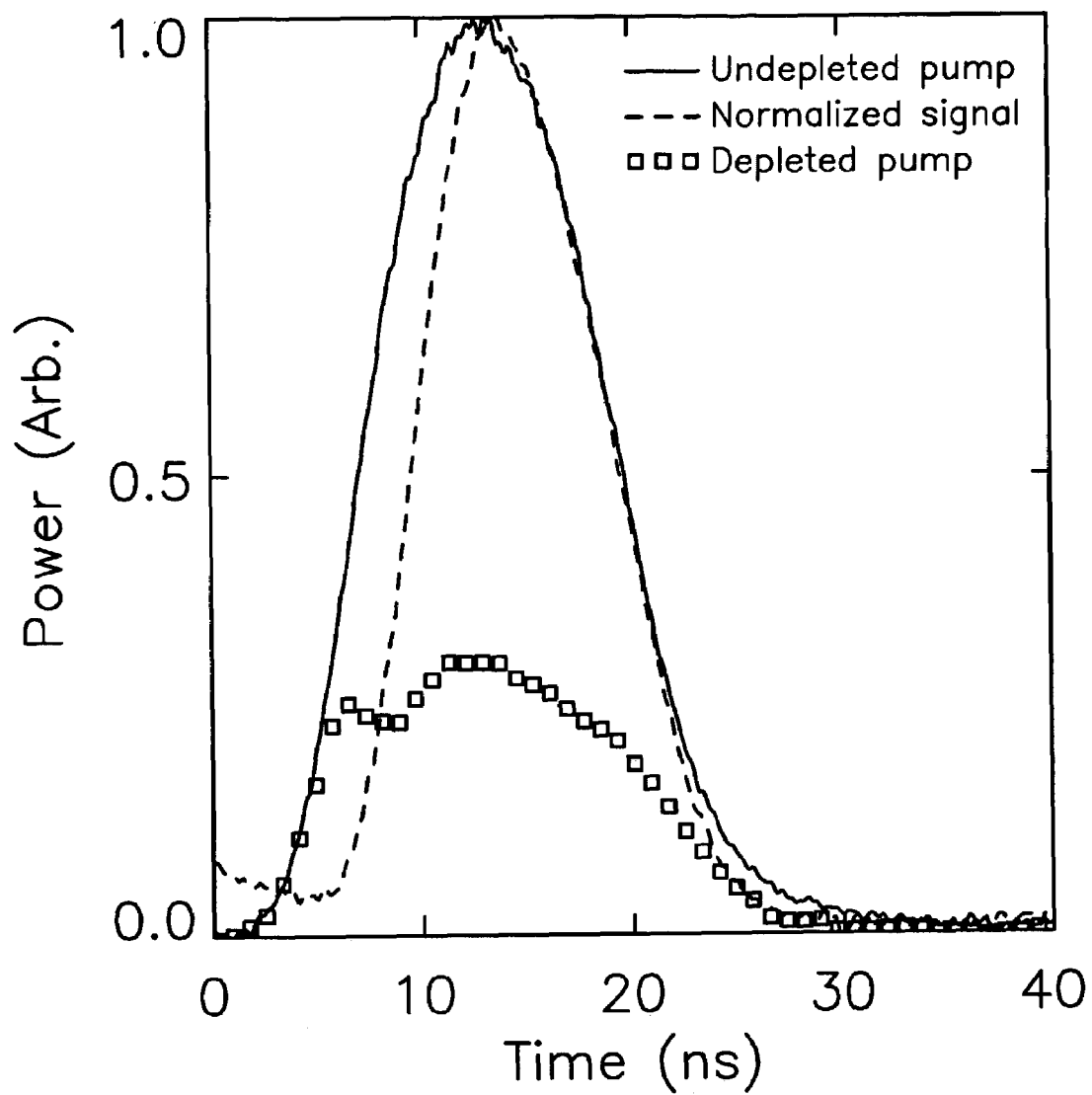
FIG. 4 shows response of the ring OPO of the present invention with pulsed seeding.
Figure 5:
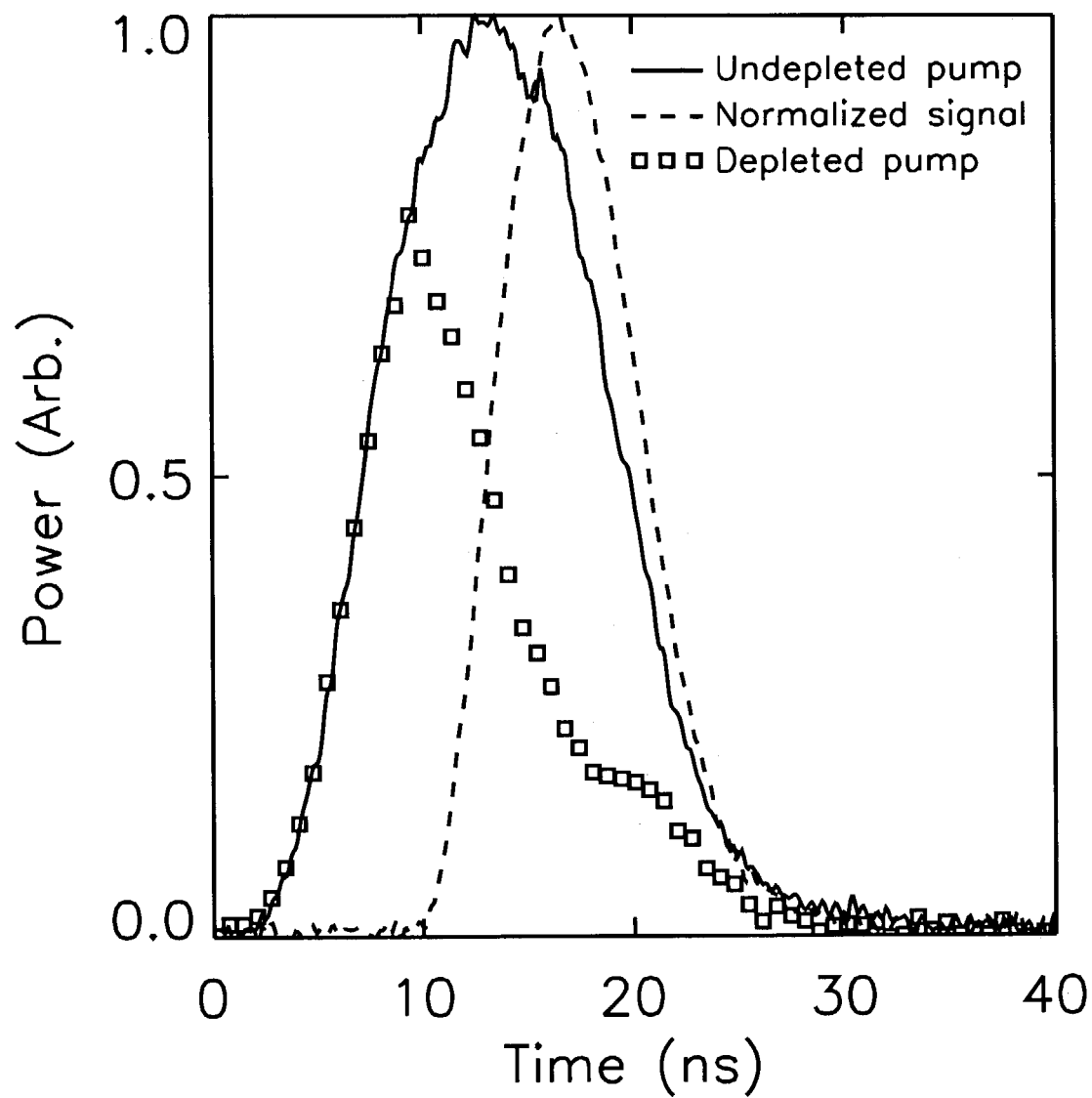
FIG. 5 shows the response of a ring OPO without seeding.

Both numerical modeling and testing have been performed using the present invention to demonstrate the improvement in conversion efficiency. Numerical modeling of an image-rotating OPO predicted that, using one crystal in the OPO cavity and a seed pulse energy of 1 mJ timed to coincide with the leading edge of the pump pulse, the conversion efficiency can be increased from approximately 40% to approximately 70% when pumped at about twice the unseeded threshold energy, conversion efficiency defined as the depletion of the main pump pulse. If two crystals are used with the idler rejected from the cavity between the crystals, the conversion efficiency can be increased to as high as 90%. Testing was performed using a ring cavity OPO with 15 ns, 532 nm pulses from a q-switched injection-seeded Nd:YAG as the OPO pump with 5 mJ used as the backward pump to generate a 1 mJ signal seed pulse. The pulse can range from approximately 1 to approximately 100 ns. This was delayed 10 ns on retroreflection to the OPO. The main pump pulse was 40 mJ, about twice threshold for the large diameter main pump. FIG. 4 shows the power response of the OPO configuration of the present invention with pulsed seeding; FIG. 5 shows the response of the same OPO configuration without pulsed seeding. Comparison of the figures shows that, with pulsed seeding, the OPO turns on earlier and the pump is more completed depleted. Conversion efficiency with pulsed seeding was approximately 65% compared with 40% without pulsed seeding.

Suitable nonlinear optical media for the crystal 21 include $KTiOPO_4$ (KTP) and its isomorphs, $KH_2PO_4$ (KDP) and its isomorphs, $LiNbO_3$ and its isomorphs, potassium pentaborate tetrahydrate (KB5) and its isomorphs, lithium formate (LFM) and its isomorphs, $Ca_4GdO(BO_3)_3$ and its isomorphs, Se, Te, III-V semiconductors, II-VI semiconductors, semiconductor quantum-well materials, HgS (cinnabar), quartz, $Ag_3AsS_3$ (proustite) and its isomorphs, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$ and its isomorphs, $CsLiB_6O_{10}$, urea, cesium dihydroarsenate and L-arginine phosphate. The instant invention can be implemented using any of the above materials, and any other nonlinear optical materials having suitable properties.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. A self-seeding optical parametric oscillator, comprising:
    means for generating a pump beam into a ring optical cavity, said ring optical cavity consisting of at least three mirrors formed around a nonlinear crystal;
    time delay means situated between said means for generating a pump beam and said ring optical cavity;
    means for generating a self-seeding pulse external to said ring optical cavity, said self-seeding pulse injected into said ring optical cavity in the direction opposite to said pump beam; and
    retroreflector means situated external to said ring optical cavity for re-injecting a portion of said self-seeding pulse back into said ring optical cavity in the direction of said pump beam.

2. The self-seeding optical parametric oscillator of claim 1 wherein said retroreflector is selected from the group consisting of a mirror and a beam expander.

3. The self-seeding optical parametric oscillator of claim 1 wherein at least one of said at least three mirrors serves as the output coupler and is at least partially transmissive and partially reflective.

4. The self-seeding optical parametric oscillator of claim 1 wherein the means for generating a pump beam is selected from a pump laser, a nanosecond pulsed laser, and a Q-switched solid state laser.

5. The self-seeding optical parametric oscillator of claim 4 wherein said means for generating a pump beam is a Nd:YAG laser.

6. The self-seeding optical parametric oscillator of claim 1 wherein the means for generating a self-seeding a pulse is a nanosecond pulsed laser.

7. The self-seeding optical parametric oscillator of claim 1 wherein the nonlinear crystal comprises a material selected from $KTiOPO_4$, $KH_2PO_4$, $LiNbO_3$, potassium pentaborate tetrahydrate, lithium formate, $Ca_4GdO(BO_3)_3$, Se, Te, III-V semiconductors, II-VI semiconductors, semiconductor quantum-well materials, HgS, quartz, $Ag_3AsS_3$, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$, $CsLiB_6O_{10}$, urea, cesium dihydroarsenate and L-arginine phosphate.

8. The self-seeding optical parametric oscillator of claim 1 further comprising a means for generating a second pump beam into said ring optical cavity, said means for generating a second pump beam situated to generate said second pump beam in the same direction as the self-seeding pulse.

9. A self-seeding optical parametric oscillator, comprising:
    means for generating a pump beam into a ring optical cavity, said ring optical cavity consisting of four mirrors formed around a nonlinear crystal:
    time delay means situated between said means for generating a pump beam and said ring optical cavity;
    means for generating a self-seeding pulse external to said ring optical cavity, said self-seeding pulse injected into said ring optical cavity in the direction opposite to said pump beam;
    retroreflector means situated external to said ring optical cavity for re-injecting a portion of said self-seeding pulse back into said ring optical cavity in the direction of said pump beam; and
    a spectral filter situated between said retroreflector means and said ring optical cavity.

10. The self-seeding optical parametric oscillator of claim 9 wherein said retroreflector is selected from the group consisting of a mirror and a beam expander.

11. The self-seeding optical parametric oscillator of claim 9 wherein at least one of said four mirrors serves as the output coupler and is at least partially transmissive and partially reflective.

12. The self-seeding optical parametric oscillator of claim 9 wherein the means for generating a pump beam is selected from a pump laser, a nanosecond pulsed laser, and a Q-switched solid state laser.

13. The self-seeding optical parametric oscillator of claim 12 wherein said means for generating a pump beam is a Nd:YAG laser.

14. The self-seeding optical parametric oscillator of claim 9 wherein the means for generating a self-seeding pulse is a nanosecond pulsed laser.

15. The self-seeding optical parametric oscillator of claim 9 wherein the nonlinear crystal comprises a material selected from $KTiOPO_4$, $KH_2PO_4$, $LiNbO_3$, potassium pentaborate tetrahydrate, lithium formate, $Ca_4GdO(BO_3)_3$, Se, Te, III-V semiconductors, II-VI semiconductors, semiconductor quantum-well materials, HgS, quartz, $Ag_3AsS_3$, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$, $CsLiB_6O_{10}$, urea, cesium dihydroarsenate and L-arginine phosphate.

16. The self-seeding optical parametric oscillator of claim 9 further comprising a means for generating a second pump beam into said ring optical cavity, said means for generating a second pump beam situated to generate said second pump beam in the same direction as the self-seeding pulse.

* * * * *